United States Patent [19]

Fujie et al.

[11] Patent Number: 4,791,638
[45] Date of Patent: Dec. 13, 1988

[54] SIGNAL PROCESSSING CIRCUIT FOR A TELEPHONE SET

[75] Inventors: Norikazu Fujie; Hitoshi Sugiyama, both of Yamanashi, Japan

[73] Assignees: Pioneer Electronic Corporation; Pioneer Video Corporation, both of Japan

[21] Appl. No.: 106,692

[22] Filed: Oct. 13, 1987

[30] Foreign Application Priority Data

Oct. 13, 1986 [JP] Japan .............................. 61-243543
Jul. 20, 1987 [JP] Japan .............................. 62-180802

[51] Int. Cl.$^4$ .............................................. H04M 1/58
[52] U.S. Cl. ...................................... 379/392; 379/395
[58] Field of Search ............... 379/392, 391, 387, 388, 379/420, 410, 411, 395

[56] References Cited

U.S. PATENT DOCUMENTS 4,506,114 3/1985 Burgin ............................ 379/392 X

FOREIGN PATENT DOCUMENTS 0129951 6/1986 Japan .................................. 379/391

Primary Examiner—James L. Dwyer
Attorney, Agent, or Firm—Sughrue, Mion, Zinn, Macpeak, and Seas

[57] ABSTRACT

A signal processing circuit for a telephone set. This circuit includes signal sending means that sends to a transmission line a sound signal produced from a telephone transmitter, a first adding circuit that adds the signal from the transmission line to the sound signal from the transmitter, an inverting circuit that phase-inverts the output signal from the first adding circuit, an impedance element provided between the transmission line and the output of the inverting circuit, and a second adding circuit that adds the output sound signal from the transmitter to the output signal from the inverting means and supplies the resulting composite signal to a telephone receiver.

3 Claims, 4 Drawing Sheets

SIGNAL PROCESSSING CIRCUIT FOR A TELEPHONE SET

BACKGROUND OF THE INVENTION

The present invention relates to a signal processing circuit for a telephone set.

The sound signal from a telephone transmitter and that supplied to the receiver of the same telephone set are carried over the same telephone line. Hence, the speaker's own voice or noise in the surrounding area received by the transmitter will be reproduced in the receiver. In order to prevent this phenomenon (generally referred to as sidetone), commercial telephone sets are equipped with an anti-sidetone signal processing circuit.

A block diagram of a prior art anti-sidetone signal processing circuit is shown in FIG. 1. A sound signal from a transmitter 8 is supplied to an amplifier 1 and a line driver 2, from which it is further supplied to the signal transmission line 3 of a telephone line. The output signal from the amplifier 1 is phase inverted by a negative-phase amplifier 4. The sound signal from the transmission line 3 is passed through a resistor 5 and combined with the output signal from the negative-phase amplifier 4, and the resultant signal is supplied to a receiver 7 through an amplifier 6. Since the sound signal from the transmission line 3 is combined with the inverted sound signal signal from the transmitter 8, the sound signal component from the transmitter 8 in the sound signal from the transmission line 3 is canceled and the remaining component is supplied to the receiver 7, thereby preventing sidetone.

This prior art anti-sidetone circuit is shown more specifically in FIG. 2. In the circuit shown in FIG. 2, a sound signal from a transmitter 11 is supplied to a negative-phase amplifier 14 through a resistor 12 and a capacitor 13. The output signal from the negative-phase amplifier 14 is further amplified by a VCA (voltage-controlled amplifier) 15 and supplied to an equalizer 19 composed of resistors 16 and 17 and a capacitor 18. The sound signal from the transmitter 11 is also supplied to a signal transmission line 22 via the resistor 12, capacitor 3, negative-phase amplifier 14, resistor 33 and a voltage/carrier converter circuit 21 serving as a line driver. The sound signal on the transmission line 22 is passed through an amplifier 23 and combined with the output of the equalizer 19. The composite signal at the output of the equalizer 19 is supplied to a receiver 33 via an amplifier 29 composed of an active element 24, a feedback resistor 25 and capacitors 26 and 28. The sound signal on the transmission line 22 is also passed through a VCA 30 and a resistor 31 to be combined with the sound signal from the transmitter 11. The gains of VCAs 15 and 30 are controlled by a DC detector circuit 32, which detects the DC level on the transmission line 22 and outputs a signal representing this level to the control terminals of VCAs 15 and 30. The impedance of the signal transmission line portion of the telephone line is signified by Z in FIG. 6.

In the prior art anti-sidetone signal processing circuit described above, the incoming sound signal from the transmission line 22 drives the receiver 33 after being supplied to the amplifier 29 via two routes, one including the amplifier 23, and the other composed of VCA 30, resistor 31, capacitor 13, negative-phase amplifier 14, VCA 15, and equalizer 19. The sound signal supplied from the transmitter 11 to the transmission line 22 via negative-phase amplifier 14, resistor 33 and voltage/current converter circuit 21 is shunted through the amplifier 23 and supplied to the output of the equalizer 19, where it is canceled by the signal supplied through the negative-phase amplifier 14. As a result, none of the inputs to the transmitter 11 such as the speaker's own voice and undesired noise will be reproduced in the receiver 33, thereby preventing sidetone.

The mechanism by which sidetone can be prevented by the circuit shown in FIG. 2 is hereunder described in detail. FIG. 3 is a simplified block diagram of this circuit. The following assumptions apply: VCA 30 has a gain of F; the transmitter 11 outputs a voltage of $e_M$; the negative-phase amplifier 14 has a gain of $-A$; the voltage/current converter circuit 21 has a gain of $1/R$; the VCA 15 has a gain of G; the equalizer 19 has a gain of EQ; the amplifier 23 has a gain of H; and the line (transmission line) impedance is Z.

The voltage/current converter circuit 21 may be configured as shown in FIG. 4, in which an input signal is supplied to the junction point between a constant-current source 21c and a zener diode 21d via an amplifier 21a and a resistor 21b. If the resistance of the resistor 21b and the output voltage of amplifier 21a are R and $e_o$, respectively, the current $i_o$ following through the resistor 21b is expressed as $i_o = e_o/R$, and the change in this current is produced as an output on the transmission line 22. Therefore, the voltage/current converter circuit 21 has a gain of $1/R$.

The operation of the circuit having the configuration described above will be discussed below, assuming that voltage/current conversion is effected with a pure resistance R and the complex component of the equalizer 19 is used to achieve sidetone canceling.

(I) Impedance in reception mode:

The impedance $Z_R$ in the reception mode can be expressed as:

$V_1$ (line voltage generated by the signal output from the telephone set at the other end of the line) divided by $I_o$ (line current). Therefore, $$-I_o = V_1 \cdot F \cdot -A \cdot 1/R \qquad (1)$$

$$Z_R = V_1/I_o = R/(F \cdot A) \qquad (2)$$

To attain matching between $Z_R$ and the line impedance Z, the following conditions must be satisfied:

$$Z_R = Z = R/(F \cdot A) \qquad (3)$$

$$R = F \cdot A \cdot Z \qquad (4)$$

In Equations (1) to (4), F denotes the gain of the VCA 30, which is controlled by the dc voltage of the line. The longer the line, the greater the line impedance Z and the lower the dc voltage of the line. Therefore, the gain F can be controlled in accordance with the length of the line so as to satisfy the condition of $R = F \cdot A \cdot Z$.

The line impedance Z is the characteristic impedance of the telephone line, which may be approximated by a complex impedance which, as shown in an equivalent circuit in FIG. 5, consists of resistors 71 and 72 and a capacitor 73.

By using a pure resistance R, reasonable matching can be attained between $Z_R$ and the complex impedance shown in FIG. 5, but it is difficult to realize complete matching. Furthermore, complex processing is necessary to execute the sidetone canceling operation to be described in (III) below.

(II) Transmission impedance and gain in transmission mode:

The impedance $Z_T$ in the transmission mode can be expressed as $V_1$ (line voltage generated by the sound signal from the transmitter 8) divided by $I_o$ (line current). Therefore, $$V_1 = \{-A \cdot Z/(R + F \cdot A \cdot Z)\} e_M \qquad (5)$$

$$I_o = \{-A/(R + F \cdot A \cdot Z)\} e_M \qquad (6)$$

$$Z_T = V_1/I_o = Z \qquad (7)$$

This means that the transmission impedance is always equal to the line impedance Z in a circuit configuration that sends a signal from a constant-current source.

(III) Sidetone canceling:

The case of canceling the sidetone that occurs as a result of reproduction in the receiver 7 of the speaker's own voice received by the transmitter 8 is shown in FIG. 1. The sound signal reproduced in the receiver 7 may be determined as follows with reference to FIG. 3:

$$V_4 = V_2 + V_3 \qquad (8)$$

$$V_2 = V_1 \cdot H \qquad (9)$$
$$= e_M \cdot H\{-A \cdot Z/(R + F \cdot A \cdot Z)\}$$

$$V_3 = V_0 \cdot G \cdot EQ \qquad (10)$$
$$= e_M \cdot G \cdot EQ\{-A \cdot R/(R + F \cdot A \cdot Z)\}$$

$$V_4 = (Z \cdot H + R \cdot G \cdot EQ)\{-A \cdot e_M/(R + F \cdot A \cdot Z)\} \qquad (11)$$

Since the condition for canceling the sidetone is $V_4 = 0$, Eq (4) can be rewritten as follows:

$$Z \cdot H + R \cdot G \cdot EQ = 0 \qquad (12)$$

$$Z = -EQ \cdot R \cdot (G/H) \qquad (13)$$

By satisfying Eq. (13), the sidetone is reduced to zero and eventually canceled. As in the case of gain F, the gain G of the VCA 15 is controlled according to the length of the line. The equalizer 19 has a complex component such as to cancel the complex component of line impedance Z. The actual system of the the prior art circuit shown in FIGS. 2 and 3 is designed so that the signal phase is inverted in the voice band frequency.

(IV) Reception gain:

The reception gain is given by $V_4/V_1$. Voltages $V_2$, $V_3$ and $V_4$ are expressed as follows:

$$V_3 = V_1 \cdot F \cdot -A \cdot G \cdot EQ \qquad (14)$$

$$V_2 = V_1 \cdot H \qquad (15)$$

$$V_4 = V_2 + V_3 = V_1(F \cdot -A \cdot G \cdot EQ + H) \qquad (16)$$

Therefore, $$V_4/V_1 = F \cdot -A \cdot G \cdot EQ + H \qquad (17)$$

As is clear from Eq. (17), the reception gain $V_4/V_1$ is determined by the interrelation of all concerned parameters.

As described above, in the prior art anti-sidetone circuit, the gain F of VCA 30 is controlled to attain impedance matching, the gain G of VCA 15 is controlled to cancel sidetone, and the gain EQ of equalizer 19 is set in such a way as to cancel the complex component of the line impedance. These characteristics required for the anti-sidetone circuit have many parameters in common, so that it is difficult to design a circuit having the overall desired characteristics.

SUMMARY OF THE INVENTION

An object, therefore, of the present invention is to provide a signal processing circuit for a telephone set that prevents sidetone in a reliable manner and which readily produces desired characteristics.

This object of the present invention can be attained by a signal processing circuit for a telephone set that comprises signal sending means that sends to a transmission line a sound signal produced from a telephone transmitter, first adding means that adds the signal from the transmission line to the sound signal from the transmitter, inverting means that phase-inverts an output signal from said first adding means, an impedance element provided between the transmission line and the output sound signal from the transmitter to the output signal from the inverting means and supplies the resulting composite signal to a telephone receiver.

DESCRIPTION OF THE PREFERRED EMBODIMENTS OF THE INVENTION

The preferred embodiments of the present invention are hereinafter described with reference to FIGS. 6 to 9.

Figure 6:
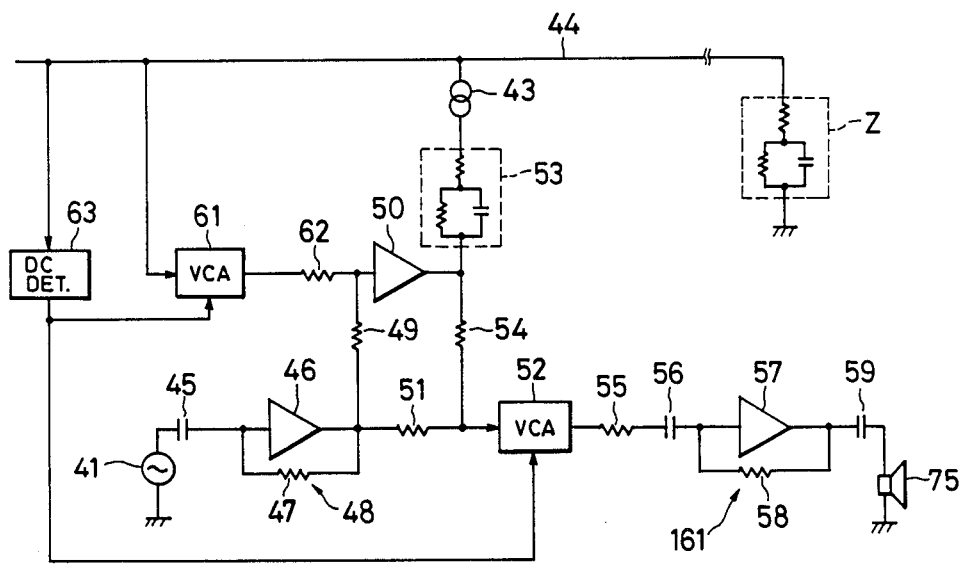
FIG. 6 is a circuit diagram of an anti-sidetone signal processing circuit according to a first embodiment of the present invention.

FIG. 6 shows an anti-sidetone signal processing circuit according to a first embodiment of the present invention.

A sound signal output from a telephone transmitter 41 is passed through a capacitor 45 and connected to an amplifier 48 including an active element 46 and a feedback resistor 47. The output of the amplifier 48 is supplied to a negative-phase amplifier 50 through a resistor 49. The output of the negative-phase amplifier 50 is connected to a transmission line 44 via an impedance element 53 composed of resistor and a capacitor and through a current/voltage converter circuit 43. The output of the amplifier 50 is also connected to a VCA 52 via a resistor 54. A resistor 51 is connected between the amplifier 48 and the VCA 52. The output signal from VCA 52 is passed through a resistor 55 and a capacitor 56 and supplied to an amplifier 161 composed of an active element 57 and a feedback resistor 58. The output of the amplifier 161 is passed through a capacitor 59 to be fed to a telephone receiver 75. The transmission line 44 is connected to the input of the negative-phase amplifier 50 via a VCA 61 and a resistor 62. The gains of VCAs 52 and 61 are controlled by a DC detector circuit 63, which detects the DC level on the transmission line 44 and outputs it to the control terminals of VCAs 52 and 61.

In the signal processing circuit for a telephone set shown in FIG. 6, the sound signal from the receiver 41 is amplified by the amplifier 48. The sound signal on the transmission line 44 is amplified by the VCA 61 and combined with the output signal from the amplifier 48. The resulting composite signal is supplied to the negative-phase amplifier 50. The output signal from the negative-phase amplifier 50 and the sound signal from the transmitter 41 that has been amplified by the amplifier 48 are combined at the input of VCA 52, with the result that the sound signal component from the transmitter 41 is canceled. Therefore, the sound signal that is supplied from the telephone line to the VCA 52, which does not contain the sound signal from the transmitter 41, is amplified by the amplifier 161 to be used as an output for driving the receiver 75.

Figure 7:
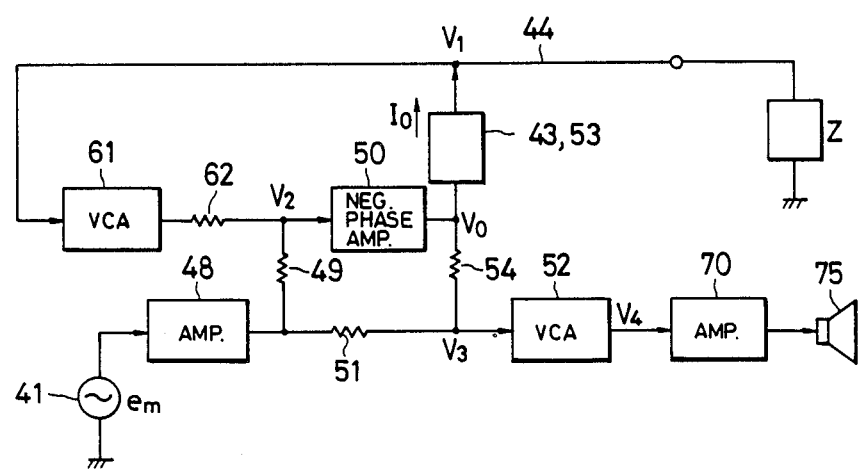
FIG. 7 is a block diagram of the circuit shown in FIG. 6.

A simplified block diagram of the circuit shown in FIG. 6 is given in FIG. 7. The following assumptions are made: the VCA 61 has a gain of F; the amplifier 48 outputs a voltage of $e_M$; the negative-phase amplifier 50 has a gain of $-A$; the voltage/current converter circuit 43 has a gain of $1/Z_x$; the VCA 52 has a gain of G; and the line impedance is Z.

The operation of the circuit shown in FIG. 7 will now be described:

(V) Impedance $Z_R$ in reception mode:
In FIG. 7, the following equations hold good:

$$-I_o = V_1 \cdot F \cdot r_2 \cdot -A \cdot (1/Z_x) \tag{18}$$

$$Z_R = V_1/I_o = Z_x/(F \cdot A \cdot r_2) \tag{19}$$

Since $r_1 = R_1/(R_1 + R_2)$ and $r_2 = R_2/(R_1 + R_2)$, where $R_1$ and $R_2$ are the resistance of resistors 62 and 49, respectively, Eq. (19) can be rewritten as:

$$Z_R = Z = Z_x/F \cdot A \cdot r_2 \tag{20}$$

Therefore, the condition for impedance matching is:

$$Z_x = F \cdot A \cdot r_2 \cdot Z \tag{21}$$

The following description will be made on the assumption that Eq. (21) is valid.

(VI) Transmission gain and impedance in transmission mode:

$$(V_1 \cdot F \cdot r_2 + e_M \cdot r_1) \cdot -A \cdot Z/Z_x = V_1 \tag{22}$$

$$V_1 = e_M\{-A \cdot r_1 \cdot Z/(Z_x + F \cdot r_2 \cdot A \cdot Z)\} \tag{23}$$

$$I_o = e_M\{-A \cdot r_1/(Z_x + F \cdot r_2 \cdot A \cdot Z)\} \tag{24}$$

Substituting Eq. (21) in Eqs. (23) and (24), $$V_1 = e_M\{-r_1/(2 \cdot F \cdot r_2)\} \tag{25}$$

$$I_o = e_M\{-r_1/2 \cdot F \cdot r_2 \cdot Z)\} \tag{26}$$

In Eqs. (25) and (26), $-r_1/(2 \cdot F \cdot r_2)$ and $-r_1/(2 \cdot F \cdot r_2 \cdot Z)$ each represent the transmission gain. Therefore, the impedance $V_1/I_o$, in the transmission mode is given by:

$$V_1/I_o = Z \tag{27}$$

(VII) Sidetone canceling:
The output voltage $V_o$ of the negative-phase amplifier 50 is given by:

$$V_o = e_M\{-A \cdot r_1 \cdot Z_x/(Z_x + F \cdot r_2 \cdot A \cdot Z)\} \tag{28}$$

Substituting Eq. (21) in Eq. (28), $$V_o = (-A/2)r_1 \cdot e_M \tag{29}$$

Voltage $V_3$ is given by:

$$V_3 = V_o \cdot r_4 + e_M \cdot r_3 \tag{30}$$

Since $r_3 = R_3/(R_3 + R_4)$ and $r_4 = R_4/(R_3 + R_4)$, where $R_3$ and $R_4$ signify the resistances of resistors 54 and 51, respectively (in the second embodiment of the present invention to be described later in this specification, $R_4$ is the resistance of a filter circuit 151), $$V_3 = -(A \cdot r_1 \cdot r_4/2)e_M + r_3 \cdot e_M \tag{31}$$

The condition for canceling sidetone is $V_3 = 0$ in Eq. (31). Therefore, the sidetone can be canceled by setting the gain A of the negative-phase amplifier 50 in such a way that the following equations is valid:

$$A \cdot r_1 \cdot r_4/2 = r_3 \tag{32}$$

$$A = 2 \cdot r_3/r_1 \cdot r_4 \tag{33}$$

(VII) Reception gain:
The output voltage $V_4$ of VCA 52 can be expressed as:

$$V_4 = V_1 \cdot F \cdot r_2 \cdot -A \cdot r_4 G \tag{34}$$

Therefore, $$V_4/V_1 = F \cdot r_2 \cdot -A \cdot r_4 \cdot G \tag{35}$$

Substituting Eq. (33) in Eq. (35), $$V_4/V_1 = -F(2 \cdot r_2 \cdot r_3/r_1)G \tag{36}$$

This means that the reception gain $V_4/V_1$ is determined by the gain F of the VCA 61 and the gain G of the VCA 52. The gain F is already set in Eq. (20) for the reception impedance $Z_R$, and the gain G of VCA 52 can be freely set since it will not cause any effects other than on the reception gain.

Substituting Eq. (33), which expresses the condition for sidetone canceling, in Eq. (21), which expresses the condition for impedance matching, $$Z_x = F\{2 \cdot r_2 \cdot r_3/(r_1 \cdot r_4)\}Z \tag{37}$$

By properly setting the relationship between each of resistors 49, 54, 62 and 51 and the gain of the negative-phase amplifier 50, both impedance matching and sidetone canceling can be accomplished.

The above-described circuit configuration can be integrated on a single chip in an easy and precise manner while properly setting the relative ratios of resistors 49, 54, 62 and 51.

As will be understood from the foregoing explanation, by setting the gain F of the VCA 61 and the gain G of the VCA 51 in consideration of impedance matching and by setting the resistances of the resistors 49, 54, 62 and 51 in such a way that Eq. (33) is satisfied, the conditions for impedance matching and sidetone canceling can be met independently of each other. As a further advantage, there are not many parameters to be taken into account since the gain G of VCA 52 has no effect other than on the reception gain and the gain F of the VCA 61 is predetermined.

It should be noted that the amplifiers 48 and 161 for amplifying the sound signal from the transmitter 41 may be omitted from the circuit shown in FIG. 6.

Figure 8:
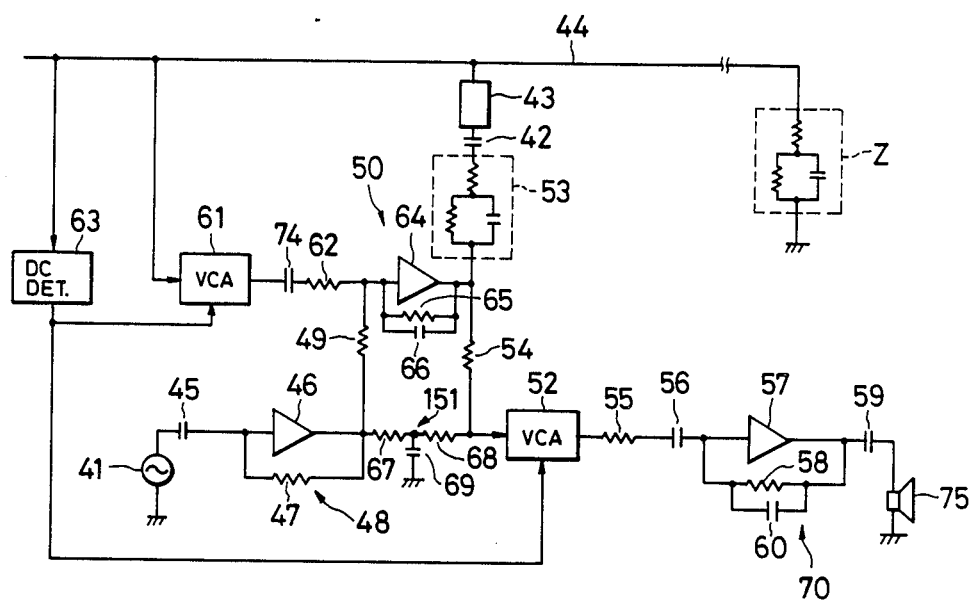
FIG. 8 is a circuit diagram of an antiside tone signal processing circuit according to a second embodiment of the present invention.

FIG. 6 is a circuit diagram showing an anti-sidetone signal processing circuit according to a second embodiment of the present invention. In FIG. 8, components which are the same as those shown in FIG. 6 are identified by like numerals. The following description of the second embodiment shown in FIG. 8 is directed only to those portions which are different from the first embodiment shown in FIG. 6.

The negative-phase amplifier 50 is composed of an active element 64 together with a feedback resistor 65 and a capacitor 66 that are connected between the input and the output of the active element 64. Instead of the resistor 51, a filter circuit 151 is connected between the amplifier 48 and VCA 52. The filter circuit 151 is a low pass filter type circuit composed of resistors 67 and 68 and a capacitor 69. A capacitor 74 is connected in series with the resistor 62. A capacitor 60 is connected in parallel with the capacitor 58. This capacitor 60 combines with the active element 57 to form an amplifier 70.

The signal path from the transmitter 41 is connected to the capacitor 45. Since the impedance of the feedback loop that is composed of the VCA 61, negative-phase amplifier 50, impedance element 53 and current/voltage converter circuit 43 is a complex impedance, sidetone can be completely canceled by the filter circuit 151.

Figure 9:
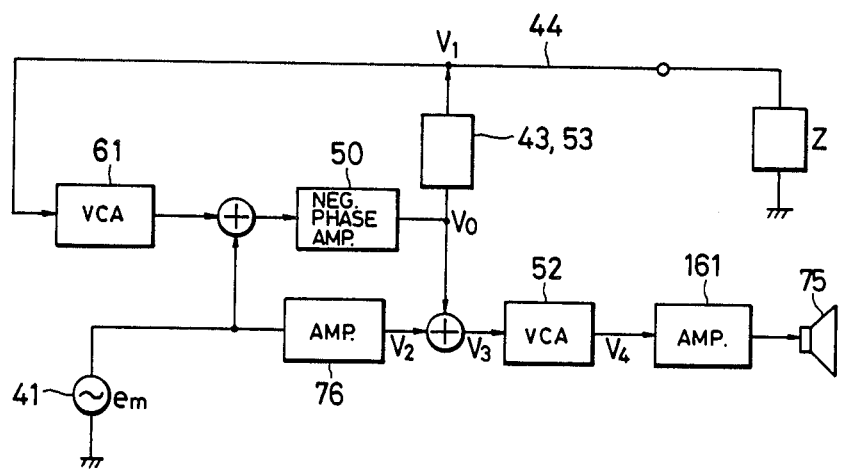
FIG. 9 is a block diagram of an anti-sidetone signal processing circuit according to a third embodiment of the present invention.

FIG. 9 is a block diagram of an anti-sidetone signal processing circuit according to a third embodiment of the present invention, in which the output of transmitter 41 is combined with the output of the VCA 61 and the resulting composite signal is directly fed to negative-phase amplifier 50, while at the same time the output of the transmitter 41 is amplified by an amplifier 76 and the amplified output is directly combined with the output from the negative-phase amplifier 50. The other portions of the circuit shown in FIG. 9 are identical to those depicted in FIGS. 6 and 7. The assumptions made regarding the circuit shown in FIG. 9 are: the VCA 61 has a gain of F; the transmitter 41 outputs a voltage of $e_M$; the negative-phase amplifier 50 has a gain of $-A$; the amplifier 76 has a gain of $A/2$; the voltage/current converter circuit 43 has a gain of $1/Z_x$; the VCA 52 has a gain of G; and the line impedance is Z.

Figure 1:
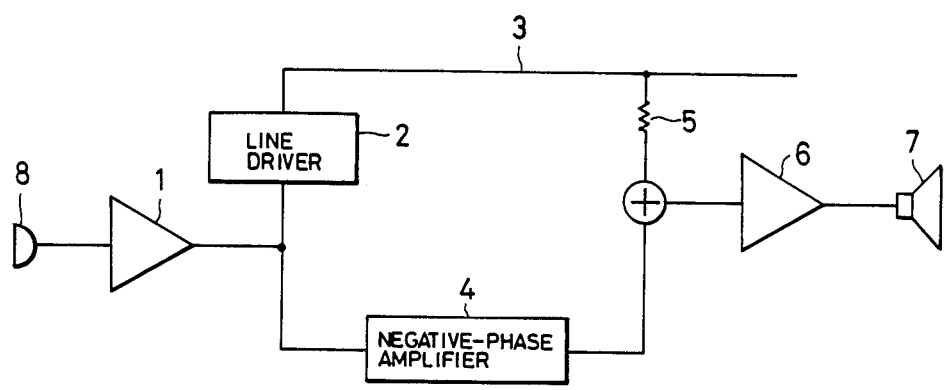
FIG. 1 is a block diagram of a prior art anti-sidetone signal processing circuit.
Figure 2:
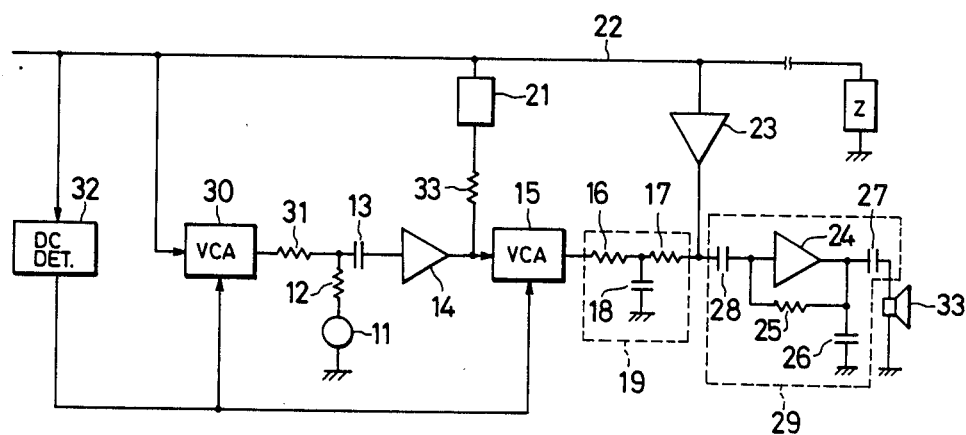
FIG. 2 is a circuit diagram showing the prior art anti-sidetone signal processing circuit in detail.
Figure 3:
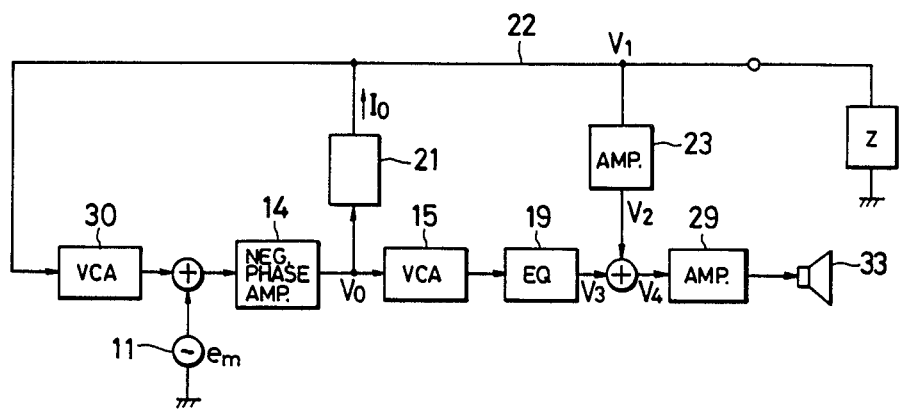
FIG. 3 is a block diagram of the circuit of FIG. 2.
Figure 4:
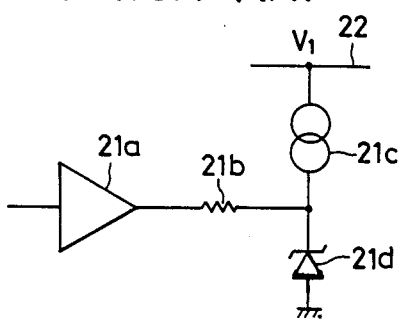
FIG. 4 is a circuit diagram showing an example of the voltage/current converter circuit in FIG. 6 or 7.
Figure 5:
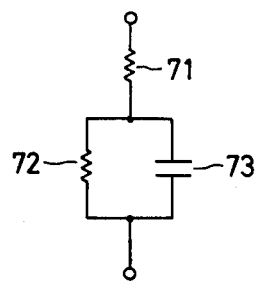
FIG. 5 is an equivalent circuit of line impedance.

The operation of the circuit shown in FIG. 4 will be described hereinafter.

(IX) Impedance in reception mode:

$$-I_o = V_1 \cdot F \cdot -A \cdot 1/Z_x \quad (38)$$

$$Z_R = V_1/I_o = Z_x/(F \cdot A) \quad (39)$$

$$Z_R = Z = Z_x/(F \cdot A) \quad (40)$$

Therefore, the condition for establishing impedance matching is:

$$Z_x = F \cdot A \cdot Z \quad (41)$$

(X) Transmission gain and impedance in transmission mode:

$$V_1 = e_M\{-A \cdot 2/(Z_x + F \cdot A \cdot Z)\} \quad (42)$$

$$I_o \times e_M\{-A/(Z_x + F \cdot A \cdot Z)\} \quad (43)$$

Substituting Eq. (41) in Eqs. (42) and (43), $$V_1 = e_M\{-A \cdot Z/(F \cdot A \cdot Z + F \cdot A \cdot Z) = e_M(-\tfrac{1}{2}F) \quad (44)$$

$$I_o = e_M\{-A/(F \cdot A \cdot G + F \cdot A \cdot Z)\} = e_M(-\tfrac{1}{2}F \cdot Z) \quad (45)$$

In Eqs. (44) and (45), $-1/(2 \cdot F)$ and $-1/(2 \cdot F \cdot Z)$ each represent the transmission gain. Therefore, the impedance $V_1/I_o$ impedence for the transmission mode is given by:

$$V_1/I_o = Z \quad (46)$$

(XI) Sidetone canceling:

$$\begin{aligned}V_o &= (V_1 \cdot F + e_M) \cdot -A \\ &= e_M \cdot -A\{-A \cdot F \cdot Z/(Z_x \cdot F \cdot A \cdot Z) + 1\}\end{aligned} \quad (47)$$

Substituting Eq. (41) in Eq. (47), $$V_o = e_M \cdot -A(-A \cdot F \cdot Z/2 \cdot F \cdot A \cdot Z + 1) \quad (48)$$

Voltages $V_3$ and $V_4$ are given by:

$$\begin{aligned}V_3 &= V_o + V_2 \\ &= (-1/2) \cdot e_M \cdot A + (1/2) \cdot e_M \cdot A \\ &= 0\end{aligned} \quad (49)$$

$$V_4 = V_3 G = 0 \quad (50)$$

Therefore, when F, A and $Z_x$ are set in consideration of impedance matching, sidetone can be entirely canceled by designing the negative-phase amplifier 50 and amplifier 76 so that they have respective gains of $-A$ and $\tfrac{1}{2}A$. The conditions for impedance matching and sidetone canceling can be made independently of each other. As a further advantage, there are not many parameters to be taken into account since the gain F of the VCA 61 is predetermined.

(XII) Reception gain:

The output voltage $V_4$ of the VCA 52 can be expressed as:

$$V_4 = V_1 \cdot F \cdot -A \cdot G \quad (51)$$

Therefore, $$V_4/V_1 = F \cdot A \cdot G \quad (52)$$

Eq. (52) shows that the reception gain, $V_4/V_1$, is set in terms of the gains F, A and G. The gains F and A are already set in the process of impedance matching, and the gain G of VCA 52 can be freely set since it has no effect other than on the reception gain.

It should be noted that the amplifier 161 may be omitted from the circuit shown in FIG. 9.

As described in the foregoing, the signal processing circuit for a telephone set of the present invention is designed so that the sound signal from a telephone transmitter is combined with the signal on a transmission line to form a composite signal which is inverted and combined with the output sound signal from the transmitter and supplied to a telephone receiver. An impedance element is connected betweeen the inverter and the transmission line, and the constants of the impedance element can be set in such a way that impedance matching is easily attained in both a transmission and a reception mode. The component in the output signal of the inverter that is produced from the transmitter is canceled to achieve complete elimination of sidetone.

What is claimed is:

1. A signal processing circuit for a telephone set, comprising:

signal sending means for sending to a transmission line a sound signal produced from a telephone transmitter;

first adding means for adding the signal from said transmission line to said sound signal;

inverting means for phase inverting an output signal from said first adding means;

an impedance element provided between said transmission line and an output of said inverting means; and second adding means for adding said sound signal to said output signal from said inverting means and supplying the resulting composite signal to a telephone receiver.

2. The signal processing circuit according to claim 1, wherein said second adding means comprises a filter circuit supplied with one of said sound signal and said output signal from said inverting means, the other signal being combined with said output signal from said filter circuit.

3. The signal processing circuit according to claim 2, wherein said filter circuit comprises a resistor-capacitor filter circuit.

* * * * *